United States Patent
Auquier et al.

(10) Patent No.: US 11,859,657 B2
(45) Date of Patent: Jan. 2, 2024

(54) SOCKET ASSEMBLY WITH A RETENTION DEVICE

(71) Applicant: Federal-Mogul Motorparts LLC, Southfield, MI (US)

(72) Inventors: Andrew Auquier, St. Peters, MO (US); Glen Parker, St. Peters, MO (US); Thomas J. Byrnes, Jr., St. Charles, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 61 days.

(21) Appl. No.: 16/806,668

(22) Filed: Mar. 2, 2020

(65) Prior Publication Data

US 2021/0270314 A1 Sep. 2, 2021

(51) Int. Cl.
F16C 11/06 (2006.01)

(52) U.S. Cl.
CPC ... *F16C 11/0633* (2013.01); *Y10T 403/32737* (2015.01)

(58) Field of Classification Search
CPC .............. F16C 11/0619; F16C 11/0623; F16C 11/0628; F16C 11/0633; F16C 11/0638; F16C 11/0647; F16C 11/0652; F16C 11/0657; F16C 11/0685; F16C 11/083; Y10T 403/32713; Y10T 403/32721; Y10T 403/32729; Y10T 403/32737; Y10T 403/32745; Y10T 403/32762; Y10T 403/32811
USPC ................................. 384/203, 206, 215, 220
See application file for complete search history.

(56) References Cited

U.S. PATENT DOCUMENTS

| | | | |
|---|---|---|---|
| 2,855,232 A | 10/1958 | Kozak | |
| 3,495,858 A * | 2/1970 | Kindel | F16C 11/083 403/140 |
| 3,497,247 A | 2/1970 | Fister et al. | |
| 3,545,797 A * | 12/1970 | Korecky | F16C 11/0638 403/140 |

(Continued)

FOREIGN PATENT DOCUMENTS

| | | | | |
|---|---|---|---|---|
| EP | 0351689 A1 * | 1/1991 | ......... | F16C 11/0628 |
| FR | 2174516 A5 | 10/1973 | | |

(Continued)

OTHER PUBLICATIONS

International Search Report, dated Jun. 1, 2021 (PCT/US2021/018161).

*Primary Examiner* — Josh Skroupa
*Assistant Examiner* — Kevin J Baynes
(74) *Attorney, Agent, or Firm* — Robert L. Stearns; Dickinson Wright PLLC

(57) ABSTRACT

One aspect of the present invention is related to a ball socket assembly that includes a housing with an inner bore and at least one open end. The ball socket assembly also includes a ball stud which is partially received in the inner bore of the housing. An exit bearing supports the ball stud and is positioned in the inner bore adjacent the at least one open end. The exit bearing includes a plastic piece and a metal piece which are connected with one another. The metal piece has a semi-conical shape. The housing is deformed adjacent the at least one open end to capture the exit bearing within the inner bore. In operation, the metal piece reinforces the plastic piece to transfer forces between the ball stud and the housing.

15 Claims, 7 Drawing Sheets

(56) References Cited

U.S. PATENT DOCUMENTS

| | | | |
|---|---|---|---|
| 3,843,272 A | 10/1974 | Jorn | |
| 4,231,673 A * | 11/1980 | Satoh | F16C 11/0633 |
| | | | 403/125 |
| 4,324,501 A * | 4/1982 | Herbenar | B62D 7/166 |
| | | | 403/133 |
| 4,725,159 A * | 2/1988 | Wood, Jr. | F16C 11/0633 |
| | | | 403/133 |
| 4,761,083 A * | 8/1988 | Smith | F16C 39/02 |
| | | | 384/208 |
| 4,797,019 A * | 1/1989 | Wood, Jr. | F16C 11/0633 |
| | | | 403/133 |
| 4,883,263 A * | 11/1989 | Buhl | B62D 7/16 |
| | | | 267/293 |
| 4,916,788 A | 4/1990 | Mitoya | |
| 5,031,545 A * | 7/1991 | Bourgeot | B61F 5/08 |
| | | | 105/199.1 |
| 5,033,722 A * | 7/1991 | Lammers | F16F 1/393 |
| | | | 267/141.1 |
| 5,573,463 A * | 11/1996 | Arlt | F16D 3/76 |
| | | | 464/147 |
| 5,609,433 A * | 3/1997 | Pazdirek | F16C 11/069 |
| | | | 403/135 |
| 5,678,947 A | 10/1997 | Urbach et al. | |
| 6,533,490 B2 | 3/2003 | Kincaid et al. | |
| 6,695,521 B2 | 2/2004 | Kincaid et al. | |
| 6,719,476 B2 * | 4/2004 | Hisi | F16C 11/0614 |
| | | | 403/135 |
| 7,195,416 B2 | 3/2007 | Holmes | |
| 7,306,393 B2 * | 12/2007 | Erdogan | F16F 1/3842 |
| | | | 403/135 |
| 7,357,591 B2 * | 4/2008 | Broker | F16C 11/086 |
| | | | 403/132 |
| 7,661,902 B2 * | 2/2010 | Brunneke | F16C 33/122 |
| | | | 403/143 |
| 8,770,884 B2 * | 7/2014 | Erdogan | F16C 11/0614 |
| | | | 403/135 |
| 8,979,376 B2 * | 3/2015 | Angenheister | F16C 33/28 |
| | | | 384/276 |
| 10,557,496 B2 * | 2/2020 | Lonergan, III | F16C 11/0685 |
| 2004/0258462 A1 | 12/2004 | Budde | |
| 2009/0080967 A1 | 3/2009 | Gercke | |
| 2012/0107038 A1 * | 5/2012 | Erdogan | F16F 1/393 |
| | | | 403/113 |
| 2015/0001824 A1 | 1/2015 | Kuroda | |
| 2016/0138646 A1 | 5/2016 | Elperman et al. | |
| 2017/0211613 A1 | 7/2017 | Umei et al. | |
| 2017/0356489 A1 | 12/2017 | Parker et al. | |
| 2018/0163775 A1 * | 6/2018 | Gräber | F16C 11/069 |
| 2019/0353200 A1 | 11/2019 | Parker et al. | |

FOREIGN PATENT DOCUMENTS

| | | | |
|---|---|---|---|
| FR | 2312687 A1 | 12/1976 | |
| GB | 884278 A | 12/1961 | |
| JP | 2010101467 A * | 5/2010 | F16C 11/083 |
| WO | WO-2005066510 A1 * | 7/2005 | F16C 11/0628 |
| WO | WO-2021010375 A1 * | 1/2021 | |

\* cited by examiner

SOCKET ASSEMBLY WITH A RETENTION DEVICE

BACKGROUND OF THE INVENTION

1. Field of the Invention

The present invention is related generally to socket assemblies of the type that are configured for use in a vehicle suspension assembly.

2. Related Art

A ball joint is a type of socket assembly which includes a housing and a ball stud which can articulate and rotate relative to one another. Such ball joints are commonly found in automobile suspension systems to connect a pair of control arms with a knuckle. Each ball joint typically includes one or more bearings that are received in an open interior of the housing between the housing and the ball stud to allow the knuckle to move relative to the control arms.

In applications where axial forces are applied on the ball stud in the same direction as that which the ball stud extends out of the housing, it is necessary to support those forces (negative loads) in a manner which restricts the axial movement of the bearings and the ball stud within the housing. In cases where the bearings are made of plastic, the plastic material can expand under load due to a contact angle between the bearing and the ball stud. Thus, a metallic cover plate is necessary to restrict the axial movement of the ball stud while simultaneously restricting movement of the plastic bearing. In cases where very heavy negative loads are expected, the cross-sectional size of the metallic cover plate and/or the strength type of metal of the cover plate is increased to obtain the strength needed to support the large negative axial loads. Ether of these solutions (increasing the thickness or strength of the cover plate) typically increases the cost to manufacture the ball joint and may interfere with or restrict stud swing of the ball stud within the housing.

SUMMARY OF THE INVENTION AND ADVANTAGES

One aspect of the present invention is related to a ball socket assembly that includes a housing with an inner bore and at least one open end. The ball socket assembly also includes a ball stud which is partially received in the inner bore of the housing. An exit bearing supports the ball stud and is positioned in the inner bore adjacent the at least one open end. The exit bearing includes a plastic piece and a metal piece which are in an overmolded connection with one another. The metal piece has a semi-conical shape. The housing is deformed adjacent the at least one open end to capture the exit bearing within the inner bore.

According to another aspect of the present invention, the housing is deformed to present a radially inwardly extending lip which is in direct contact with a top surface of the exit bearing.

According to yet another aspect of the present invention, the plastic piece of the exit bearing has an inner surface which is in direct contact with the ball stud at two spaced apart locations.

According to still another aspect of the present invention, the inner surface of the plastic piece includes at least one angled portion which is angled relative to a central axis of the inner bore and which is in direct contact with one hemisphere of a ball portion of the ball stud.

According to a further aspect of the present invention, the inner surface of the plastic bearing further includes a cylindrical portion which is in direct contact with an equator of the ball portion of the ball stud.

According to yet a further aspect of the present invention, when viewed in cross-section, the metal piece is angled relative to the at least one angled portion of the inner surface.

According to still a further aspect of the present invention, the at least one angled portion of the inner surface is at an angle of between 15 to 25 degrees relative to the central axis.

According to another aspect of the present invention, the ball socket assembly further includes a backing bearing which is disposed in the inner bore of the housing and supports an opposite hemisphere of the ball portion of the ball stud from the at least one angled portion of the inner surface of the plastic piece of the exit bearing.

According to yet another aspect of the present invention, the metal piece has at least one through opening, and a plastic material of the plastic piece extends through the at least one through opening.

Another aspect of the present invention is related to a ball socket assembly which includes a housing that has an inner bore and at least one open end. The ball socket assembly further includes a ball stud which has a ball portion and a shank portion. The ball portion is received in the inner bore of the housing, and the shank portion projects out of the housing through the at least one open end. The ball portion of the ball stud is supported by an exit bearing which is positioned in the inner bore between the ball portion and the at least one open end of the housing. The exit bearing includes a plastic piece made of a plastic material and a metal piece made of a metal material. The plastic and metal pieces are in an overmolding connection with one another. The metal piece has a semi-conical shape and is at least partially embedded within the plastic piece for reinforcing the plastic piece to transfer increased forces between the ball stud and the housing.

According to another aspect of the present invention, the plastic piece of the exit bearing includes an inner surface with an angled portion which is in direct contact with one hemisphere of the ball portion of the ball stud.

According to yet another aspect of the present invention, the inner surface of the exit bearing further includes a cylindrical portion which is in direct contact with an equator of the ball portion of the ball stud.

A further aspect of the present invention is related to a ball socket assembly which includes a housing with an inner bore that has at least one open end. The ball socket assembly further includes a ball stud that has a ball portion which is received in the inner bore of the housing. An exit bearing supports the ball stud and is positioned in the inner bore adjacent the at least one open end. The exit bearing includes a plastic piece and a metal piece. The housing is deformed adjacent the at least one open end to capture the exit bearing within the inner bore. The plastic piece of the exit bearing presents a bearing surface which is in slidable contact with the ball portion of the ball stud. The metal piece has a semi-conical shape and, as viewed in cross-section, the metal piece extends generally perpendicularly to at least a portion of a surface-to-surface contact location between the bearing surface of the plastic piece and the ball portion of the ball stud for reinforcing the plastic piece to transfer increased forces between the ball stud and the housing.

According to another aspect of the present invention, the bearing surface of the plastic piece has at least one angled portion which is in direct contact with one hemisphere of the ball portion of the ball stud and which extends at an angle relative to a central axis of the housing and wherein the metal piece extends generally perpendicularly to the at least one angled portion.

According to yet another aspect of the present invention, the bearing surface of the plastic piece further includes a cylindrical portion which is in direct contact with an equator of the ball portion of the ball stud.

Yet another aspect of the present invention is related to a method of making a ball socket assembly. The method includes the step of making a semi-conical metal piece. The method continues with the step of injection molding a plastic piece around at least a portion of the metal piece to create an exit bearing with the plastic and metal pieces being in an overmolding connection with one another. The method proceeds with the step of inserting a ball portion of a ball stud into an inner bore of a housing through at least one open end of the housing. The method continues with the step of inserting the exit bearing into the inner bore of the housing and supporting the ball portion of the ball stud with the exit bearing.

According to another aspect of the present invention, the method further includes the step of deforming the housing to capture the exit bearing within the inner bore of the housing.

According to yet another aspect of the present invention, the exit bearing supports both one hemisphere of the ball portion of the ball stud and an equator of the ball portion of the ball stud.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
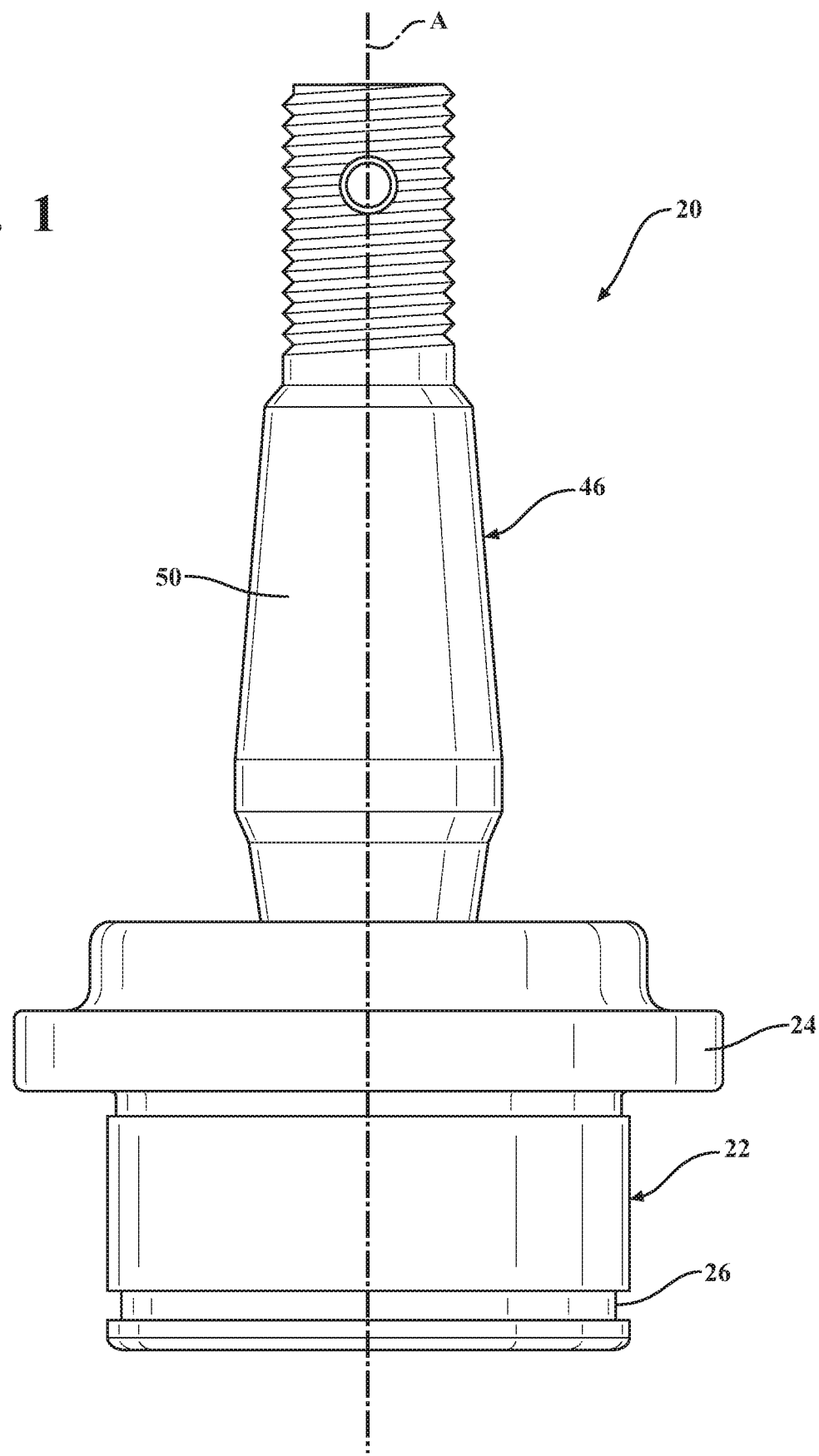
FIG. 1 is a front elevation view of an exemplary embodiment of an exemplary embodiment of a ball joint constructed according to one aspect of the present invention.

Referring to the Figures, wherein like numerals indicate corresponding parts throughout the several views, a ball socket assembly 20 in the form of a ball joint 20 for a vehicle is generally shown in FIG. 1. The exemplary of the ball joint 20 is of the type which may experience either high compression loads (positive loads) or high tension loads (negative loads) and configured for use in a steering and suspension system (not shown) of a vehicle. For example, the ball joint 20 could be employed to operably connect a control arm (not shown) with a knuckle (not shown) or it could be a part of a tie rod end (not shown) for connecting a steering rack (not shown) with the knuckle. Other automotive and non-automotive applications are also contemplated.

Figure 2:
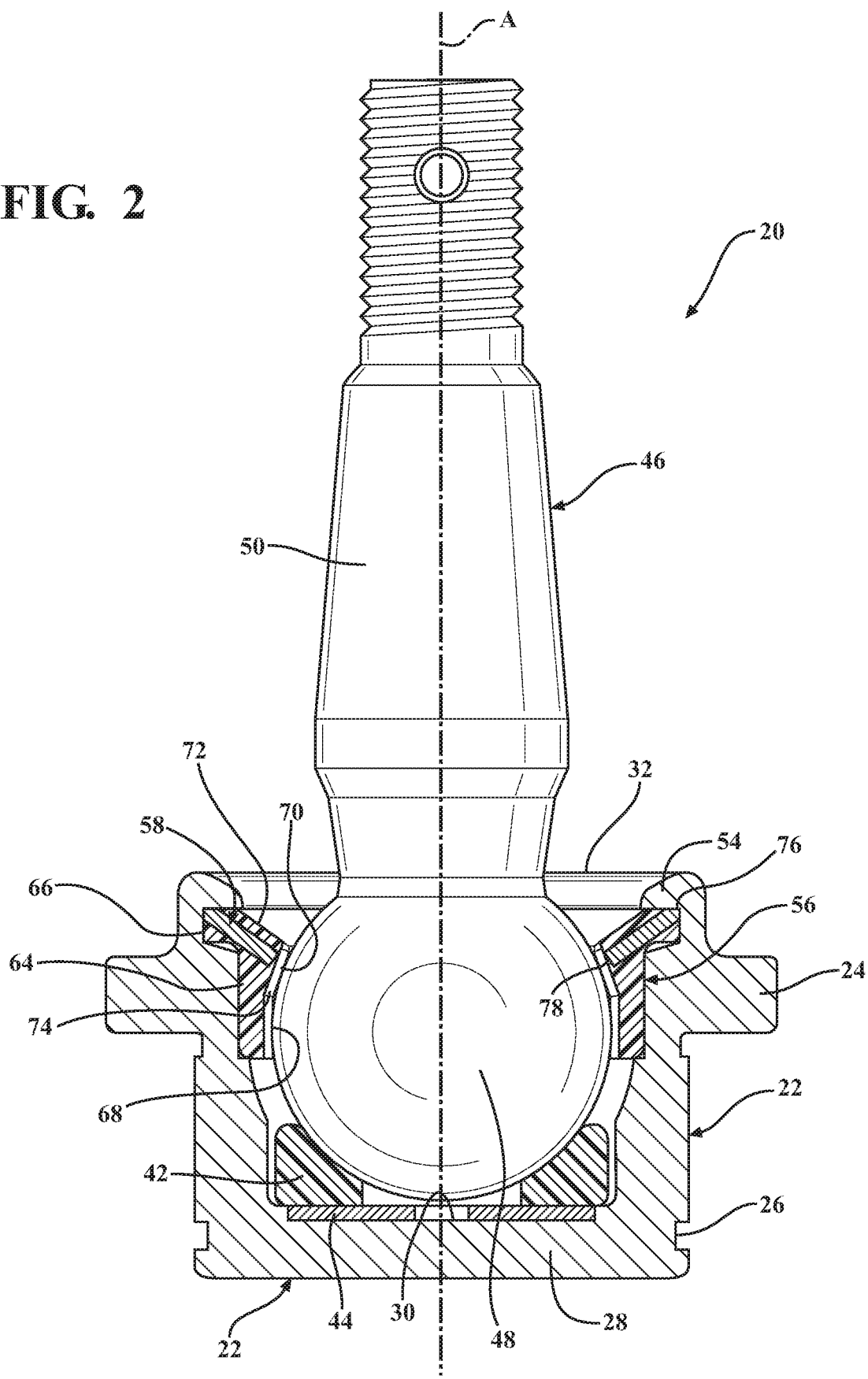
FIG. 2 is a partial cross-sectional view of the ball joint of FIG. 1.
Figure 3:
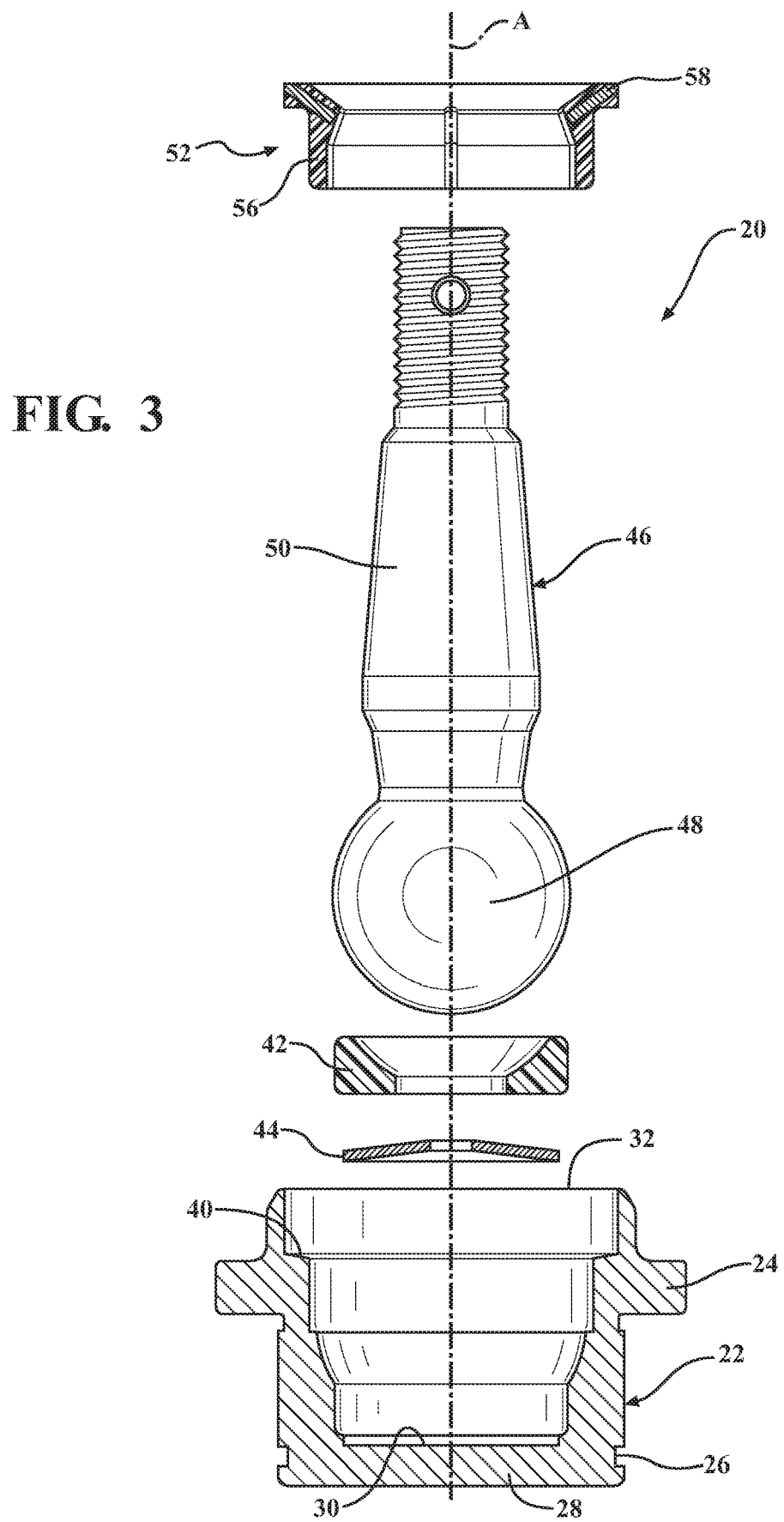
FIG. 3 is an exploded view of the ball joint of FIG. 1.

Referring now to FIGS. 2 and 3, the exemplary embodiment of the ball joint 20 includes a cartridge-style housing 22 which can be press-fit into an opening of a first component, such as the control arm. The housing 22 has a cylindrical exterior surface which may be knurled to provide an improved interference fit with the first component. The housing 22 also has a radially outwardly extending flange 24 which defines a stopping point for press-fitting the housing 22 into the opening during an installation procedure. The housing 22 also has a circumferentially extending groove 26 which is spaced from the flange 24 for receiving a retainer ring (not shown) to lock the housing 22 with the first component.

Figure 4:
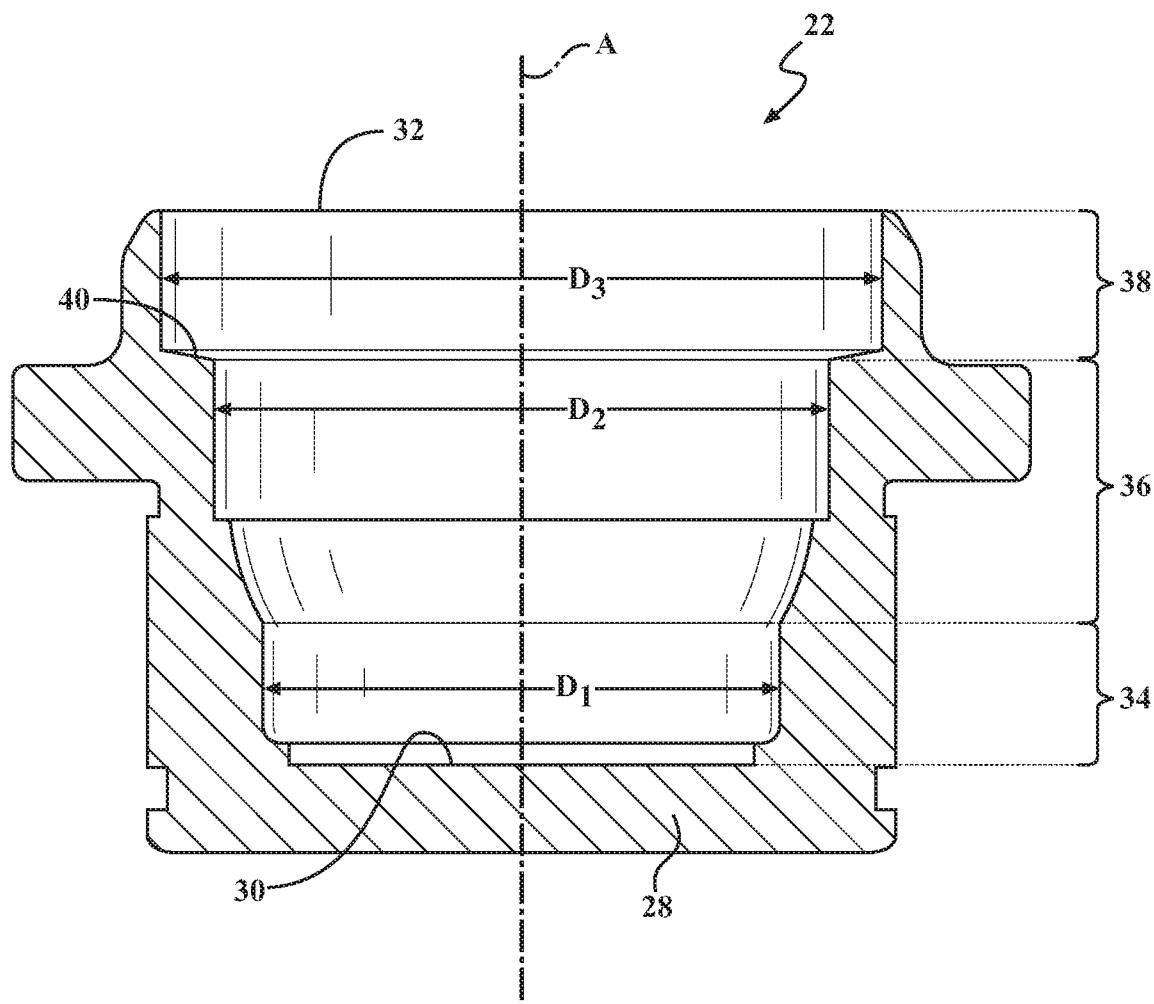
FIG. 4 is a cross-sectional view of a housing of the ball joint of FIG. 1 in a pre-assembly condition.

As shown in FIG. 4, the housing 22 has an inner bore which extends along a vertical central axis A from a lower wall 28 at a closed first end 30 to an open second end 32. In the axial direction from the closed first end 30 to the open second end 32, the inner bore has first, second, and third zones 34, 36, 38 with progressively increasing diameters $D_1$, $D_2$, $D_3$. More specifically, the first zone 34 adjacent the closed first end 30 has a first diameter $D_1$, the second zone 36 has a greater second diameter $D_2$, and the third zone 38 adjacent the open second end 32 has a still greater third diameter $D_3$. Between the second and third zones 36, 38, the housing 22 presents a shoulder 40 which faces towards the open second end 32.

The housing 22 is preferably made as a single, monolithic piece of metal, such as steel or an alloy steel, and may be shaped through any suitable process or processes including, for example, casting, forging, machining from a billet, etc. At least the lower wall 28 is preferably shaped to its final form via at least one of the casting, forging, and machining operations. That is, the lower wall 28 is not bent or otherwise plastically deformed to its final shape. As discussed in further detail below, shaping the lower wall 28 to its final form without plastic deformation allows the ball joint 20 to be compression loaded whereby positive axial loads are exerted on the lower wall 28 when the ball joint 20 is installed in a vehicle suspension system.

Referring now additionally to FIGS. 2 and 3, a backing bearing 42 is disposed in the first zone 34 of the inner bore and has an outer diameter which is less than the first diameter $D_1$ such that the backing bearing 42 can radially move, or float, within the inner bore. A Belleville washer 44 (also known as a washer spring) that is made of spring steel is disposed in the first zone 34 of the inner bore between the backing bearing 42 and the lower wall 28 to apply an upward (i.e., toward the open second end 32) biasing force on the backing bearing 42. When the ball socket assembly 20 is assembled, the Belleville washer 44 may flatten to allow the backing bearing 42 to float radially within the inner bore.

The ball joint 20 further includes a ball stud 46, which has a ball portion 48 and a shank portion 50. The ball portion 48 is disposed in the inner bore of the housing 22 and has a semi-spherically curved outer surface with a lower hemisphere, an equator, and an upper hemisphere. The backing bearing 42 has a curved first bearing surface which supports the lower hemisphere of the ball portion 48 for transferring positive axial forces (upward with respect to the orientations of the components in the Figures) between ball stud 46 and the lower wall 28 of the housing 22. The shank portion 50 of the ball stud 46 projects out of the housing 22 through the open second end 32 for attachment with a second component (such as a knuckle) of the steering/suspension system. The ball stud 46 is preferably made of a single, monolithic piece of metal, such as steel or an alloy steel and may be shaped through any suitable process or combination of processes. A boot (not shown) is preferably sealed against the housing 22 and the shank portion 50 of the ball stud 46 for retaining a lubricant within and keeping contaminants out of the inner bore of the housing 22.

An annular exit bearing 52 is disposed in the second and third zones 36, 38 of the inner bore of the housing 22 and supports both the equator and the upper hemisphere of the ball portion 48 of the ball stud 46 for transferring both radial and negative axial (downward, with respect to FIG. 2) forces between the ball stud 46 and the housing 22. An upper edge of the housing 22 is deformed, such as through a swaging operation, to present a radially inwardly extending lip 54 which directly engages a planar top surface of the exit bearing 52 to capture the exit bearing 52, ball portion 48, backing bearing 42, and Belleville washer 44 within the inner bore of the housing 22.

The exit bearing 52 is made as two pieces, namely a plastic piece 56 and a metal piece 58. In the exemplary embodiment, the plastic and metal pieces 56, 58 are fixedly attached with one another by way of an overmolding connection whereby the metal piece 58 is fully or substantially encapsulated within the plastic piece 56. Fabrication of the exit bearing 52 involves pre-forming the metal piece 58 (such as through casting or stamping) and inserting the metal piece 58 into a cavity of a mold (not shown). A melted plastic material is then injected into the cavity around at least a portion of the metal piece 58. The plastic material is allowed to cool and solidify to form the plastic piece 56 around and in a fixed engagement with the metal piece 58. In the exemplary embodiment, the metal piece 58 includes a plurality of circumferentially spaced apart openings 60. The material of the plastic piece 56 extends through these openings 60 to strengthen the connection between the plastic and metal pieces 56, 58. The metal piece 58 is preferably made of steel, an alloy steel, aluminum, or an aluminum alloy. However, any suitable metallic material may be employed. In the exemplary embodiment, the plastic piece 56 is made of a polyamide material which is reinforced with 30-33% wt. glass fibers. This material has been found to provide the exit bearing 52 with exceptional strength, durability, and wear resistance.

Figure 5:
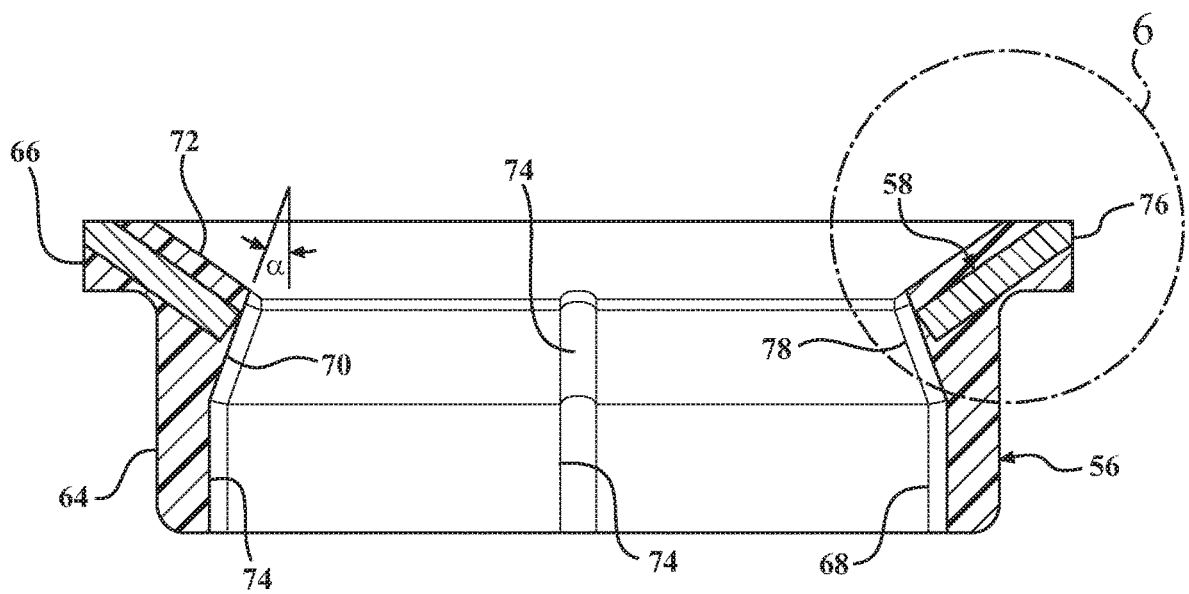
FIG. 5 is a cross-sectional view of an exit bearing of the ball joint of FIG. 1.
Figure 6:
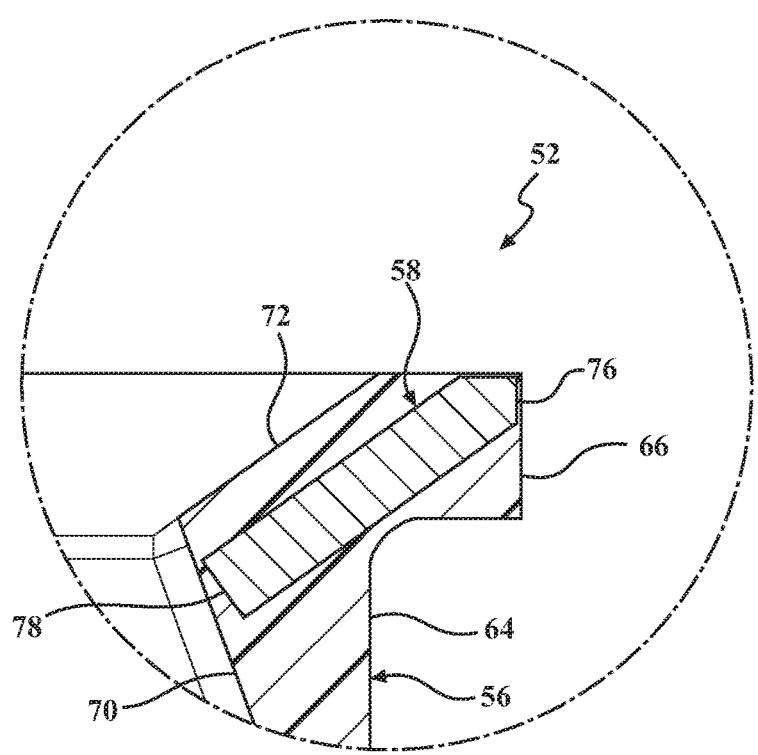
FIG. 6 is an enlarged view of a portion of the exit bearing of FIG. 5.
Figure 7:
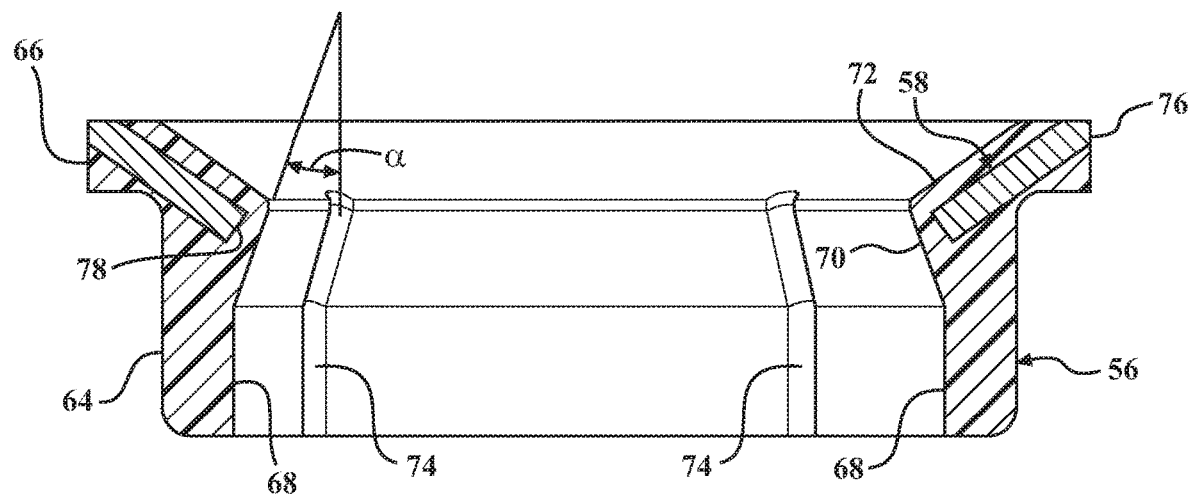
FIG. 7 is another cross-sectional view of the exit bearing of FIG. 5; and showing a portion of the ball stud in phantom lines.
Figure 8:
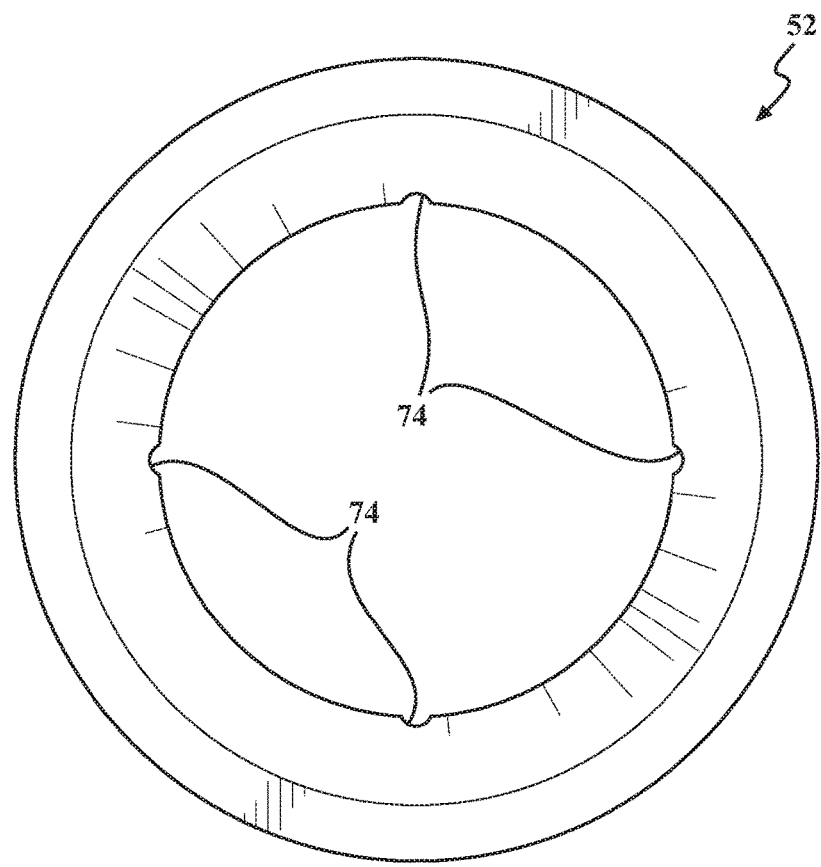
FIG. 8 is a top elevation view of the exit bearing of FIG. 5.
Figure 9:
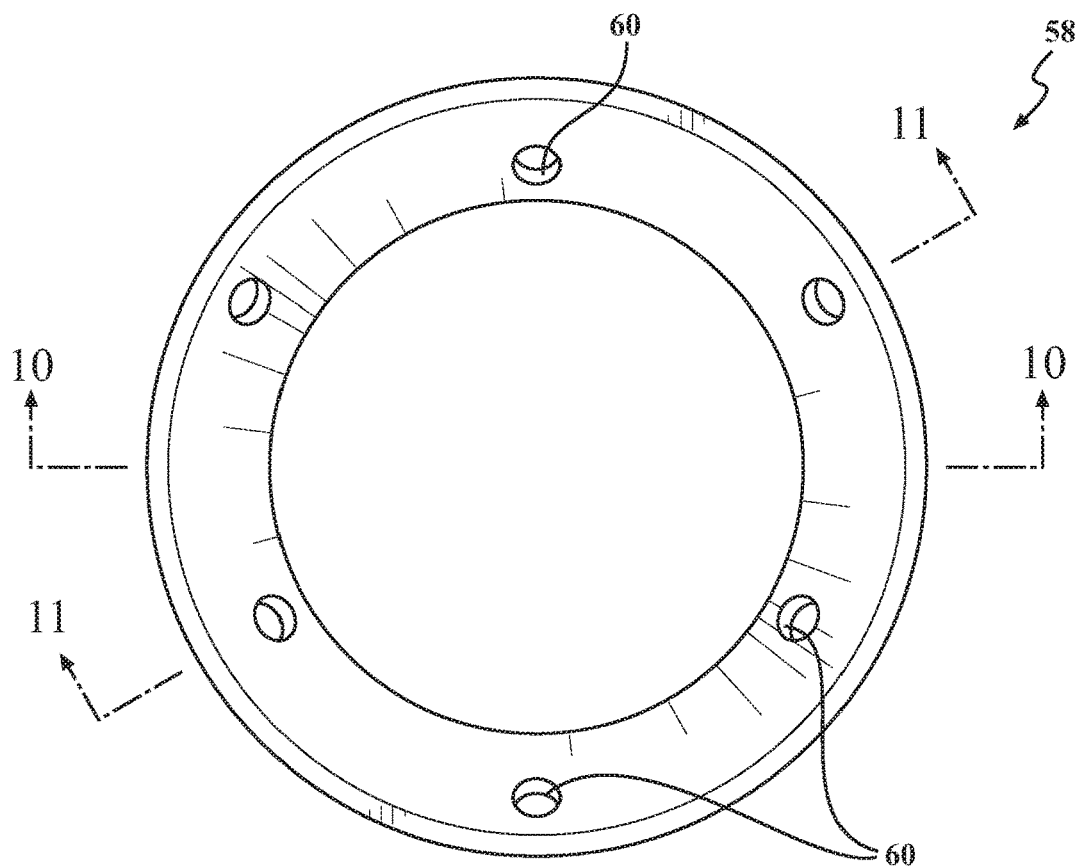
FIG. 9 is a top elevation view of a metal piece of the exit bearing of FIG. 5.
Figure 10:
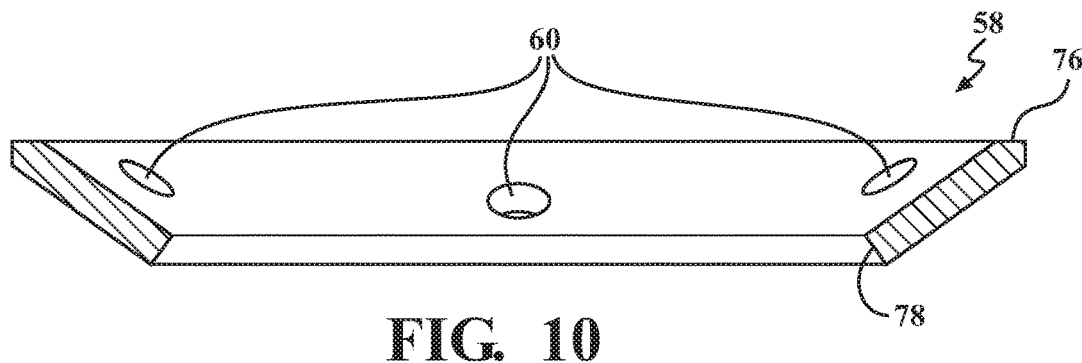
FIG. 10 is a cross-sectional view of the metal piece of FIG. 9 taken through Line 10-10 of FIG. 9.
Figure 11:
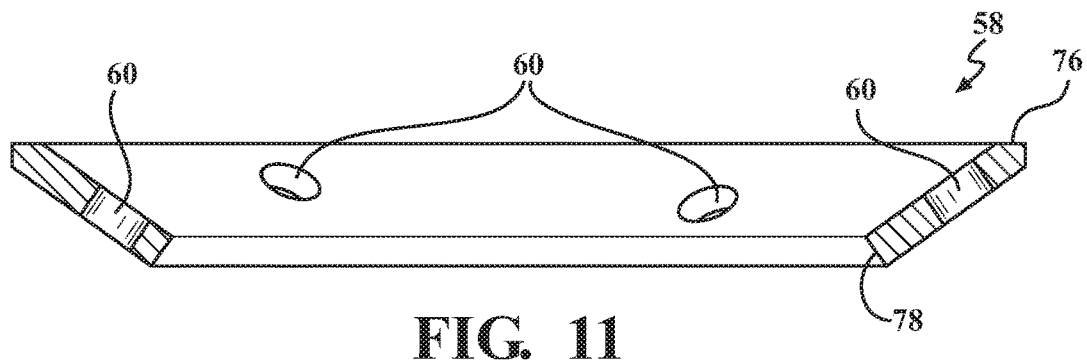
FIG. 11 is another cross-sectional view of the metal piece of FIG. 9 taken through Line 11-11 of FIG. 9.

Referring now to both FIGS. 2 and 5, the plastic piece 56 has an inner surface which faces towards the central axis A and an outer surface which faces away from the central axis A. The outer surface has a first cylindrical portion 64 and a flange portion 66. The cylindrical portion 64 extends axially from a planar bottom surface of the plastic piece 56 to the flange portion 66 and sits within the second zone 36 of the inner bore of the housing 22. The flange portion 66 extends radially outwardly from the first cylindrical portion 64 and then axially to the top surface of the plastic piece 56. Thus, the flange portion 66 has a greater diameter than the first cylindrical portion 64 and sits within the third zone 38 of the inner bore of the housing 22. The flange portion 66 rests against a shoulder which separates the second and third zones 36, 38 of the inner bore of the housing 22. During the swaging operation, the contact between the flange portion 66 and the shoulder holds the exit bearing 52 in a fixed location within the inner bore.

Starting from the bottom surface and going towards the top surface of the plastic piece, the inner surface sequentially includes a second cylindrical portion 68, a first angled portion 70, and a second angled portion 72. The second cylindrical portion 68 has a diameter which is similar to an outer diameter of the ball portion 48 of the ball stud 46 and is in direct contact with an equator of the ball portion 48 for transferring radial forces between the ball stud 46 and the housing 22. The second cylindrical portion 68 extends axially past the equator in both axial directions, i.e., both above and below the equator.

The first angled portion 70 is angled towards the central axis A at a constant first angle $\alpha$, which is preferably in the range of fifteen to twenty-five degrees (15-25°) relative to the axial direction and is in direct surface-to-surface contact with the ball portion 48 of the ball stud 46. The second angled portion 72 is angled away from the central axis A by a greater angle than the first angled portion 70, which allows for an increased swing angle of the ball stud 46 relative to the housing 22. The inner surface further includes a plurality of circumferentially spaced apart and axially extending lubricant grooves 74 which extend from the bottom surface through the second cylindrical portion 68 and through the first angled portion 70. In the exemplary embodiment, the inner surface includes four lubricant grooves 74 which are oriented at ninety degrees (90°) relative to one another for distributing the lubricant around the surface-to-surface area of contact between the plastic piece 56 and the ball portion 48.

The metal piece 58 has a shape which is similar to the shape of a Belleville washer. That is, the metal piece 58 has a generally constant thickness and has an outer surface which approximates the shape of a frustum of a cone, i.e., the metal piece 58 is semi-conical in shape. The metal piece 58 has an outer edge 76 and an inner edge 78 which lie in different planes that are spaced axially from one another with the inner edge 78 being closer to the closed first end 30 of the housing 22 and with the outer edge 76 being closer to the open second end 32 of the housing 22. The outer edge 76 is at or adjacent to an intersection between the top surface and the outer surface of the plastic piece 56. The inner edge 78 is located at or immediately adjacent to the first angled portion 70 of the inner surface of the plastic piece 56 immediately adjacent to where the inner surface contacts the ball portion 48 of the ball stud 46. As viewed in cross-section, the metal piece 58 extends at an angle that is generally perpendicular to the first angled portion 70 of the inner surface. This configuration has been found to maximize the reinforcing performance of the metal piece 58 to allow the exit bearing 52 to resist increased forces being transferred through the exit bearing 52 between the ball portion 48 of the ball stud 46 and the housing 22 without compromising the structural integrity of the plastic piece 56.

As viewed in cross-section, the ball portion 48 of the ball stud 46 is in direct contact with the plastic piece 56 of the exit bearing 52 in two axially spaced apart locations. The first location is between the second cylindrical portion 68 of the inner surface and the equator of the ball portion 48 for transferring radial forces between the ball stud 46 and the housing 22 via the exit bearing 52. The second location is between the first angled portion 70 of the inner surface and the upper hemisphere of the ball portion 48 for transferring axial forces between the ball stud 46 and the housing 22 via the exit bearing 52. The angled configuration of the metal piece 58 within the plastic piece 56 reinforces the exit bearing 52 to resist deformation when subjected to increased forces as compared to the exit bearings in other known ball socket assemblies.

Another aspect of the present invention is related to a method of making a ball socket assembly 20, such as the ball joint 20 shown in FIGS. 1-3. An exemplary embodiment of the method includes the step of injection molding the plastic piece 56 around at least a portion of the metal piece 58 to create the exit bearing 52. The method continues with the step of inserting the ball portion 48 of the ball stud 46 into the inner bore of the housing 22 through the open second end 32 of the housing 22. The method continues with the step of inserting the exit bearing 52 into the inner bore of the housing 22 and supporting the ball portion 48 of the ball stud 46 with the exit bearing 52. The method proceeds with the step of deforming the housing 22 adjacent the open second end 32 to capture the exit bearing 52 within the inner bore of the housing 22.

Obviously, many modifications and variations of the present invention are possible in light of the above teachings and may be practiced otherwise than as specifically described while within the scope of the appended claims. It should also be appreciated that the use of directional terms, such as "upper", "lower", "top", and "bottom" are with reference to the orientations of certain features in the Figures and are not intended to require any particular orientation. Additionally, it is to be understood that all features of all claims and all embodiments can be combined with each other as long as they do not contradict each other.

What is claimed is:

1. A ball socket assembly, comprising:
a housing having an inner bore extending along a longitudinal housing axis and an open end and a closed end axially opposite the open end;
a ball stud partially received in said inner bore;
an exit bearing supporting said ball stud and positioned in said inner bore adjacent said open end, said exit bearing including a plastic piece and a metal piece in an overmolded connection with one another, and said metal piece having a frustum shape tapering inward toward the housing axis from a wide end thereof adjacent the opened end to a narrow end axially inward and closer to the housing axis; and
said housing being deformed adjacent said open end to overlap the wide end of the metal piece and capture said exit bearing within said inner bore.

2. The ball socket assembly as set forth in claim 1 wherein said housing is deformed to present a radially inwardly extending lip which is in direct contact with a top surface of said exit bearing.

3. The ball socket assembly as set forth in claim 1 wherein said plastic piece of said exit bearing has an inner surface which is in direct contact with said ball stud at two spaced apart locations.

4. The ball socket assembly as set forth in claim 3 wherein said inner surface of said plastic piece includes at least one angled portion which is angled relative to the housing axis and which is in direct contact with one hemisphere of a ball portion of said ball stud.

5. The ball socket assembly as set forth in claim 4 wherein said inner surface of said plastic piece further includes a cylindrical portion which is in direct contact with an equator of said ball portion of said ball stud.

6. The ball socket assembly as set forth in claim 4 wherein, when viewed in cross-section, said metal piece is angled relative to said at least one angled portion of said inner surface.

7. The ball socket assembly as set forth in claim 4 wherein said at least one angled portion of said inner surface is at an angle of between 15 to 25 degrees relative to said housing axis.

8. The ball socket assembly as set forth in claim 4 further including a backing bearing disposed in said inner bore of said housing and supporting an opposite hemisphere of said ball portion of said ball stud from said at least one angled portion of said inner surface of said plastic piece of said exit bearing.

9. The ball socket assembly as set forth in claim 1 wherein said metal piece has at least one through opening through a body of the metal piece intermediate upper and outer peripheries of the metal piece and wherein a plastic material of said plastic piece extends through said at least one through opening.

10. A ball socket assembly, comprising:
a housing having an inner bore extending along a longitudinal housing axis between an open end of the housing and a closed end;
a ball stud having a ball portion and a shank portion, said ball portion being received in said inner bore of said housing, and said shank portion projecting out of said housing through said open end;
said ball portion of said ball stud being supported by an exit bearing which is positioned in said inner bore between said ball portion and said open end of said housing;
said exit bearing including a plastic piece made of a plastic material and a metal piece made of a metal material, said plastic and metal pieces being in an overmolding connection with one another; and
said metal piece having a frustum shape and being at least partially embedded within said plastic piece for reinforcing said plastic piece to transfer increased forces between said ball stud and said housing and wherein the frustum shape is tapering inward toward the housing axis from a wide end thereof adjacent the opened end to a narrow end axially inward and closer to the housing axis.

11. The ball socket assembly as set forth in claim 10 wherein said plastic piece of said exit bearing includes an inner surface with an angled portion which is in direct contact with one hemisphere of said ball portion of said ball stud.

12. The ball socket assembly as set forth in claim 11 wherein said inner surface of said exit bearing further includes a cylindrical portion which is in direct contact with an equator of said ball portion of said ball stud.

13. A ball socket assembly, comprising:
a housing having an inner bore extending along a longitudinal housing axis between open and closed ends of the housing;
a ball stud including a ball portion which is received in said inner bore;
an exit bearing supporting said ball stud and positioned in said inner bore adjacent said open end, said exit bearing including a plastic piece and a metal piece in an overmolded connection with one another;
said housing being deformed adjacent said at least one open end to capture said exit bearing within said inner bore;
said plastic piece of said exit bearing presenting a bearing surface which is in slidable contact with said ball portion of said ball stud; and
said metal piece having a frustum shape and, as viewed in cross-section, said metal piece extending perpendicularly to at least a portion of a surface-to-surface contact location between said bearing surface of said plastic piece and said ball portion of said ball stud for reinforcing said plastic piece to transfer increased forces between said ball stud and said housing and wherein the frustum shape is tapering inward toward the housing axis from a wide end thereof adjacent the opened end to a narrow end axially inward and closer to the housing axis.

14. The ball socket assembly as set forth in claim 13 wherein said bearing surface of said plastic piece has at least one angled portion which is in direct contact with one hemisphere of said ball portion of said ball stud and which extends at an angle relative to a central axis of said housing and wherein said metal piece extends transversely to said at least one angled portion.

15. The ball socket assembly as set forth in claim 14 wherein said bearing surface of said plastic piece further includes a cylindrical portion which is in direct contact with an equator of said ball portion of said ball stud.

\* \* \* \* \*